(12) United States Patent
Parkinson et al.

(10) Patent No.: US 8,227,546 B2
(45) Date of Patent: Jul. 24, 2012

(54) MULTILAYER ELASTIC FILM STRUCTURES

(75) Inventors: Shaun S. Parkinson, Tarragona (ES); Martin M. Hill, Tarragona (ES); John Garnett, Rosharon, TX (US)

(73) Assignee: Dow Global Technologies LLC, Midland, MI (US)

( * ) Notice: Subject to any disclaimer, the term of this patent is extended or adjusted under 35 U.S.C. 154(b) by 1123 days.

(21) Appl. No.: 12/088,772

(22) PCT Filed: Oct. 6, 2006

(86) PCT No.: PCT/US2006/039197
§ 371 (c)(1),
(2), (4) Date: Mar. 31, 2008

(87) PCT Pub. No.: WO2007/044544
PCT Pub. Date: Apr. 19, 2007

(65) Prior Publication Data
US 2008/0226920 A1    Sep. 18, 2008

(51) Int. Cl.
*C08F 110/00* (2006.01)
*C08F 210/06* (2006.01)
*B32B 27/32* (2006.01)

(52) U.S. Cl. ........... 525/191; 525/240; 428/411.1; 428/516; 428/213; 428/515; 428/35.2; 428/523; 526/351; 526/348; 526/352

(58) Field of Classification Search ........... 428/518, 428/411.1, 516, 213, 515, 35.2, 523; 525/240, 525/191; 526/351, 348, 352
See application file for complete search history.

(56) References Cited

U.S. PATENT DOCUMENTS

| | | |
|---|---|---|
| 3,959,425 A | 5/1976 | Herrington |
| 4,820,471 A | 4/1989 | van der Molen |
| 5,008,204 A | 4/1991 | Stehling |
| 5,272,236 A | 12/1993 | Lai et al. |
| 5,278,272 A | 1/1994 | Lai et al. |
| 5,419,934 A | 5/1995 | Wilson |
| 5,504,172 A | 4/1996 | Imuta et al. |
| 5,516,475 A | 5/1996 | Wilson |
| 5,641,848 A | 6/1997 | Giacobbe et al. |
| 5,844,045 A | 12/1998 | Kolthammer et al. |
| 5,869,575 A | 2/1999 | Kolthammer et al. |
| 6,960,635 B2 | 11/2005 | Stevens et al. |
| 2002/0006482 A1* | 1/2002 | Falla et al. ............ 428/35.2 |
| 2003/0194575 A1 | 10/2003 | Tau et al. |
| 2004/0082750 A1 | 4/2004 | Tau et al. |
| 2005/0054800 A1 | 3/2005 | Tau et al. |
| 2006/0004167 A1 | 1/2006 | Tau et al. |

FOREIGN PATENT DOCUMENTS

| | | |
|---|---|---|
| DE | 19650673 A1 | 6/1998 |
| EP | 474376 A2 | 3/1992 |
| EP | 595252 A1 | 5/1994 |
| WO | 9304486 A1 | 3/1993 |
| WO | 0001745 A1 | 1/2000 |
| WO | 0153079 A1 | 7/2001 |
| WO | WO 2005/035598 * | 4/2005 |
| WO | 2006115839 A1 | 11/2006 |
| WO | 2007025727 A1 | 3/2007 |

OTHER PUBLICATIONS

Randall, Journal of Macromolecular, Reviews in Macromolecular Chemistry and Physics, C29 (2&3), 201-317 (1989).
E.P. Otocka et al., Macromolecules, 4, 507-514 (1971).
Th.G. Scholte et al., J. Appl. Polym. Sci., 29, 3763-3782 (1984).
The Encyclopedia of Chemical Technology, Kirk-Othmer, Third Edition, John Wiley & Sons, New York, vol. 16, pp. 416-417, 1981.
The Encyclopedia of Chemical Technology, Kirk-Othmer, Third Edition, John Wiley & Sons, New York, vol. 18, pp. 191-192, 1982.
W.D. Harris et al., TAPPI Proceedings, Polymers, Laminations & Coatings Conference, Book 1, 1990, pp. 313-316.
Han, et al., Polymer Engineering and Science, Feb. 1978, vol. 18, No. 3, pp. 187-199.
Morris, Polymers, Laminations & Coatings Conference, TAPPI Proceedings, Atlanta, GA, 1996, pp. 571-577.
Iida, Tetrahedron Lett., 2001, 42, p. 4841-4844.

* cited by examiner

*Primary Examiner* — James J Seidleck
*Assistant Examiner* — Deve E Valdez
(74) *Attorney, Agent, or Firm* — Whyte Hirschboeck Dudek SC

(57) ABSTRACT

Multi-layer elastic air quenched blown film structures are disclosed which include: a first layer incorporating a propylene-based copolymer and optionally, a linear low density polyethylene or a low density polyethylene; and at least one second layer incorporating a linear low density polyethylene copolymer and optionally, a propylene-based copolymer and/or a low density polyethylene. Alternatively the second layer of the film structures may contain an in-reactor blend of a substantially linear polyethylene (or a homogeneously branched linear polyethylene) and a linear low density polyethylene. The film structures show an excellent balance of Dart impact, Elmendorf tear (in both the machine direction and cross direction), elastic holding force and elastic recovery.

20 Claims, 3 Drawing Sheets

MULTILAYER ELASTIC FILM STRUCTURES

FIELD

This invention relates to elastic multilayer air-quenched blown films.

OBJECTS OF THE INVENTION

One object of the invention is to provide a multilayer air quenched blown film exhibiting an excellent balance of physical properties, such as Elmendorf tear, dart impact, and elasticity. The film comprises at least one layer which contains a propylene-based copolymer.

Another object of the invention is to provide an air quenched blown film that will provide one and/or all of the above benefits while also being capable of being converted into a blown film on typically available air quenched blown film equipment at commercially acceptable rates.

A still further object of the invention is to provide a film as described above that can be utilized in stretch hood applications for the unitization of pallets of goods/materials.

BACKGROUND

Currently, blown films are made predominantly from ethylene polymers. There are references to blowing films of propylene polymers, but none are observed to be commercially successful.

Giacobbe and Pufka in U.S. Pat. No. 5,641,848 disclose making blown films from a propylene polymer material of broad molecular weight distribution (MWD of 4-60), a melt flow rate of 0.5 to 50 dg/min. and xylene insolubles (at 25° C.) of greater than or equal to 94 percent, said propylene polymer material selected from a broad molecular weight distribution propylene homopolymer and an ethylene propylene rubber impact modified broad molecular weight homopolymer.

In some instances, blowing films of polypropylene has been achieved by coextruding a polypropylene with another polymer. For instance, Nicola disclosed in DE 19650673 the use of a rubber modified polypropylene layer between polypropylene layers. Similarly, Landoni in EP 595252 disclosed the use of linear low density polyethylene (LLDPE) or linear medium density polyethylene, optionally with added hydrogenated hydrocarbon resins or other resins or low molecular weight polyethylene or polypropylene waxes between external layers of polypropylene. In EP 474376, Schirmer et al. disclose the use of an ethylene vinyl acetate copolymer (EVA), very low density polyethylene (VLDPE) or ethylene alpha olefin copolymer with a broad molecular weight distribution with a polypropylene layer and a sealable layer.

SUMMARY

In a first embodiment, the invention is a multi-layer elastic air quenched blown film structure, the film comprising:

A. A first layer comprising from 40 to 80 percent by weight of the film structure, the first layer comprising:
 (1) from 50 to 85% by weight of a propylene-based copolymer having substantially isotactic propylene sequences, the propylene-based copolymer comprising from 84 to 91 percent by weight units derived from propylene and from about 9 to about 16 percent by weight units derived from ethylene, the propylene-based copolymer having a melt flow rate (MFR) of from 0.1 to 10 g/10 min, a heat of fusion of from 2 to 50 Joules/gram, a molecular weight distribution (Mw/Mn) of less than 4, preferably less than 3.5, more preferably less than 3.0, and a density of from 0.855 to 0.876 g/ml; and
 (2) from 50 to 15 percent by weight of an linear low density polyethylene copolymer having a melt index (MI) from 0.1 to 10 g/10 minutes and a density of from 0.900 to 0.923 g/ml; and B. A second layer comprising from 10 to 30 percent by weight of the film structure, the second layer comprising:
 (1) from 55 to 85 percent by weight of a low density polyethylene (preferably a homopolymer) having a density of from 0.918 to 0.928 g/ml and having a melt index (MI) of from 0.1 to 9; and
 (2) from 15 to 45 percent by weight of a linear low density polyethylene copolymer having a density of from 0.900 to 0.923 g/ml and a melt index (MI) of from 0.1 to 10 g/10 minutes; and
 (3) optionally, from 1000 to 20,000 ppm anti-block additive, the film structure exhibiting: (a) a dart impact value of at least 220 g/mil according to ISO 7765-1, (b) an Elmendorf tear strength of at least 115 g/mil in the machine direction according to ASTM D-1922, (c) an Elmendorf tear strength of at least 270 g/mil in the cross direction according to ASTM D-1922, an (d) elastic recovery of at least 78 percent in cross direction after being extended to a strain of 200 percent its original length; and a final holding force in the "stretch hood test" (described below) of at least 700 lbft/inch$^2$, preferably at least 730 lbft/inch$^2$ (after a "high" stretch (200%-175%) test) and/or 363 lbft/inch$^2$ (after a "normal" stretch (160%-140%) test).

In a second embodiment of the invention, the film structure has a core layer comprised of the first layer A above, which is sandwiched between two outer layers, wherein at least one of the outer layers is comprised of the second layer B, above. Preferably, the first layer A is sandwiched between two second layer B's, as described above. In this second embodiment, the film exhibits the balance of properties set forth for the first embodiment, above.

In a third embodiment of the invention, the film structure has a core layer comprised of the propylene-based copolymer of the first layer A, above. Optionally, the core layer contains LLDPE (or preferably an in-reactor blend as described below), to enhance the compatibility of the first and second layers. The core layer preferably is sandwiched between two outer layers, wherein at least one of the outer layers (and preferably both) is comprised of:
 (1) from 70 to 100 percent of an in-reactor blend of a substantially linear polyethylene (or a homogeneously branched linear polyethylene) and a linear low density polyethylene having a density of from 0.900 to 0.925 g/ml and a melt index (MI) of from 0.5 to 1.5 g/10 minutes; and
 (2) from 0 to 30 percent of a low density polyethylene (preferably a homopolymer) having a density of from 0.918 to 0.928 g/ml and having a melt index (MI) of from 0.25 to 1 g/10 minutes; and
 (3) optionally, from 1000 to 20,000 ppm anti-block additive, the film structure exhibiting: (a) a dart impact value of at least 220 g/mil according to ISO 7765-1, (b) an Elmendorf tear strength of at least 250 g/mil in the machine direction according to ASTM D-1922, (c) an Elmendorf tear strength of at least 300 g/mil in the cross direction according to ASTM D-1922, an (d) elastic recovery of at least 78 percent in cross direction after being extended to a strain of 200 percent its original length; and a final holding force in the "stretch hood test" (described below) of at least 700 lbft/inch$^2$, preferably at least 730 lbft/inch$^2$ (after a "high" stretch (200%-175%) test and/or at least 363 lbft/inch$^2$ (after a "normal" stretch (160% -140%) test).

In a fourth embodiment, the film structure comprising:
A. A first layer comprising from 40 to 80 percent by weight of the film structure, the first layer comprising:
   (1) from 40 to 85% by weight of a propylene-based copolymer having substantially isotactic propylene sequences, the propylene-based copolymer comprising from 84 to 91 percent by weight units derived from propylene and from about 9 to about 16 percent by weight units derived from ethylene, the propylene-based copolymer having a melt flow rate (MFR) of from 0.1 to 10 g/10 min, a heat of fusion of from 2 to 50 Joules/gram, a molecular weight distribution (Mw/Mn) of less than 4, preferably less than 3.5, more preferably less than 3.0, and a density of from 0.855 to 0.876 g/ml; and
   (2) from 60 to 15 percent by weight of an low density polyethylene copolymer having a melt index (MI) from 0.1 to 5 g/10 minutes and a density of from 0.918 to 0.928 g/ml; and
B. A second layer comprising from 10 to 30 percent by weight of the film structure, the second layer comprising:
   (1) from 0 to 60 percent by weight of a low density polyethylene (preferably a homopolymer) having a density of from 0.918 to 0.928 g/ml and having a melt index (MI) of from 0.1 to 9; and
   (2) from 40 to 100 percent by weight of a linear low density polyethylene copolymer having a density of from 0.900 to 0.923 g/ml and a melt index (MI) of from 0.1 to 10 g/10 minutes; and
   (3)) from 0 to 20 percent by weight of a propylene-based copolymer having having substantially isotactic propylene sequences, the propylene-based copolymer comprising from 84 to 91 percent by weight units derived from propylene and from about 9 to about 16 percent by weight units derived from ethylene, the propylene-based copolymer having a melt flow rate (MFR) of from 0.1 to 10 g/10 min, a heat of fusion of from 2 to 50 Joules/gram, a molecular weight distribution (Mw/Mn) of less than 4, and a density of from 0.855 to 0.876 g/ml; and
   (4) optionally, from 1000 to 20,000 ppm anti-block additive; and,
   (5) optionally, from 200 to 1000 ppm slip additive,
the film structure exhibiting: (a) a dart impact value of at least 350 g/mil according to ASTM D-1720 (Type B), (b) an Elmendorf tear strength of at least 450 g/mil in the machine direction according to ASTM D-1922, (c) an Elmendorf tear strength of at least 500 g/mil in the cross direction according to ASTM D-1922, and a final holding force in the "alternate stretch hood test" (described below) of at least 350 lbf/in$^2$, preferably at least 400 lbf/in$^2$ (after a "high" stretch (200%-175%) test) and/or 400 lbf/in$^2$ (after a "normal" stretch (160%-140%) test).

Where processibility is critical, the low density polyethylene (LDPE) preferably is present at levels of at least 10 percent by weight of a second layer. Where elasticity (stretchability/holding force) is critical, the propylene-based copolymer is present at levels of at least 10 percent by weight of a second layer.

In a fifth embodiment of the invention, the film structure has a core layer comprised of the first layer A of the fourth embodiment, which is sandwiched between two outer layers, wherein at least one of the outer layers is comprised of the second layer B of the fourth embodiment. Preferably, the first layer A is sandwiched between two second layer B's, as described in the fourth embodiment. In this fifth embodiment, the film exhibits the balance of properties set forth for the fourth embodiment.

In the fourth and fifth embodiments, the propylene-based copolymer preferably comprises 70 weight percent or less of the overall film structure. While a value of elastic recovery is not set forth for the fourth and fifth embodiments, since the film structures exhibit a final holding force of at least 350 lbf/in2, it is expected they will have an elastic recovery of at least 75% in the cross direction, preferably at least 78%.

For the purposes of this invention:

A "substantially linear polyethylene" is that polyethylene as described in U.S. Pat. Nos. 5,373,236 and 5,278,272; and "Homogeneously branched linear polyethylenes" are polyethylenes having a CDBI greater than 50% as calculated in accordance with WO 93/04486 using the equipment and procedures as described in U.S. Pat. No. 5,008,204, such as polyethylenes available from the Exxon Chemical Company under the trade names EXCEED and EXACT.

Particular embodiments are those articles including elastic stretch hoods for pallet stabilization and unitization applications, elastic gloves, elastic bandages, stretch label films, and other end-use applications which one of skill in the art would recognize could benefit from the film structures of the embodiments described above.

All embodiments of the invention provide films exhibiting excellent mechanical properties, such as Elmendorf tear, elastic recovery and dart impact.

FIGURES

DETAILED DESCRIPTION

Figure 1:
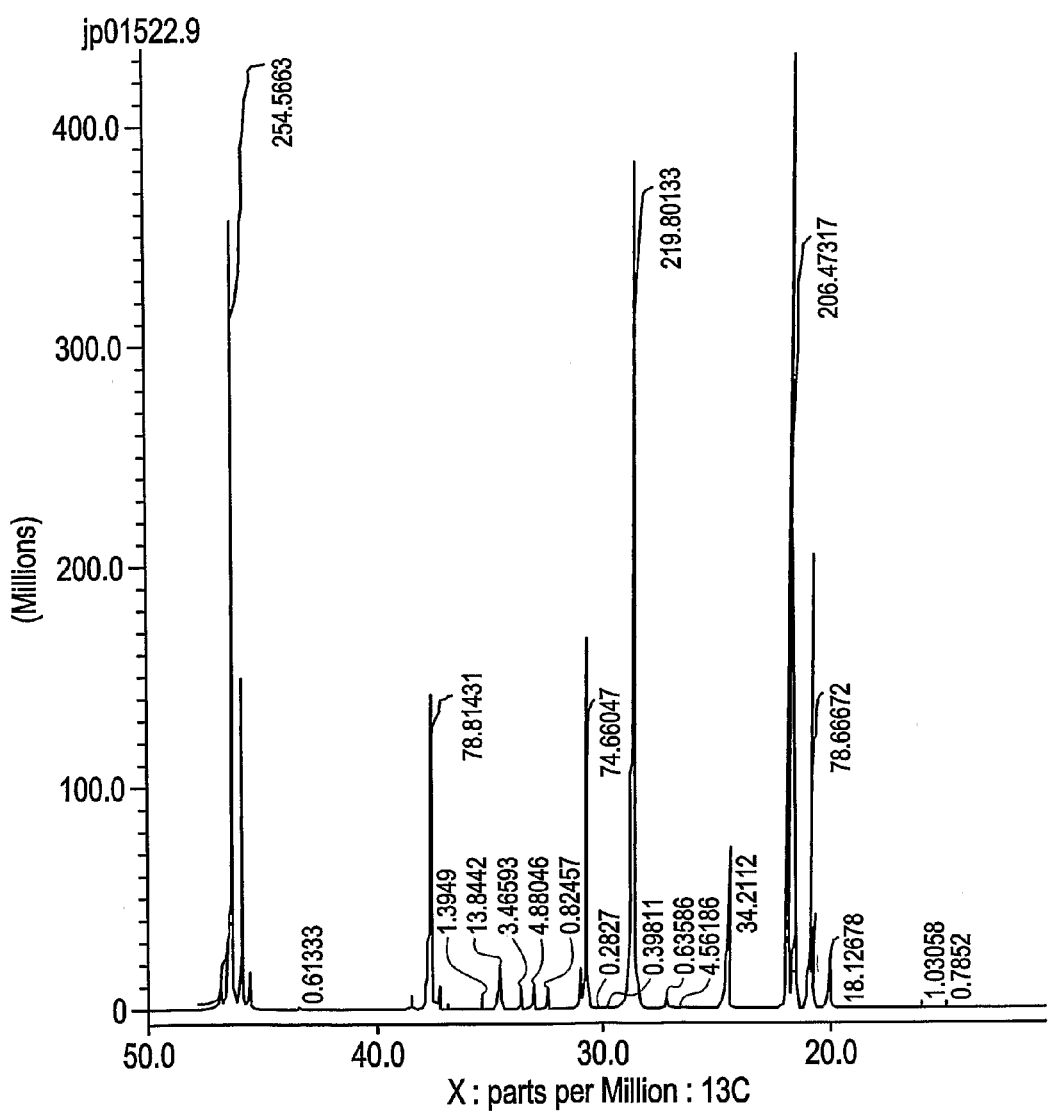
FIG. 1 shows the $^{13}$C NMR Spectrum of a propylene-ethylene copolymer (made with an activated non-metallocene, metal centered, heteroaryl ligand catalyst similar to Catalyst A), which is similar to the propylene-based copolymers described in the Examples.

Polyethylenes for the Film Structure:
Linear Low Density Polyethylene Copolymer (LLDPE):

In the first and second embodiments, the LLDPE typically comprises from 20 to 40 percent by weight of the total film structure. Preferably, the LLDPE comprises from 23 to 37 percent by weight of the film structure, more preferably from 25 to 35 percent by weight, further more preferably from 27 to 33 percent by weight of the total film structure.

In the third embodiment, the in-reactor blend of a substantially linear polyethylene (or a homogeneously branched linear polyethylene) and a linear low density polyethylene copolymer typically comprises from 40 to 70 percent by weight of the total film structure. Preferably, the in-reactor blend comprises from 45 to 65 percent by weight of the film structure, more preferably from 48 to 62 percent by weight, further more preferably from 52 to 58 percent by weight of the total film structure.

In the fourth and fifth embodiments, the LLDPE typically comprises from 30 to 50 percent by weight of the total film structure. Preferably, the LLDPE comprises from 33 to 47 percent by weight of the film structure, more preferably from 35 to 45 percent by weight, further more preferably from 37 to 43 percent by weight of the total film structure.

In-Reactor Blend Ethylene Polymers

Examples of in-reactor polyethylene blends of substantially linear polyethylene and LLDPE are disclosed in U.S. Pat. No. 5,844,045 to Kolthammer et al. and U.S. Pat. No. 5,869,575 to Kolthammer et al.

Preferably, the LLDPE fraction of the in-reactor polyethylene blend is at least fifty weight percent (50 wt %) of the in-reactor blend, more preferably at least fifty five weight percent (55 wt %), most preferably at least sixty weight percent (60 wt %). Preferably the LLDPE fraction of the in-reactor blend does not exceed eighty five weight percent (85 wt %) of the in-reactor blend, more preferably does not exceed eighty weight percent (80 wt %), most preferably does not exceed seventy five weight percent (75 wt %).

The polymer starting materials are suitably of any molecular weight distribution (MWD). MWD is calculated as the ratio $M_w/M_n$, where $M_w$, is the weight average molecular weight and $M_n$ is the number average molecular weight. Those skilled in the art are aware that polymers having a MWD less than 3 are conveniently made using a metallocene or constrained geometry catalyst (especially in the case of ethylene polymers) or using electron donor compounds with Ziegler Natta catalysts. In the practice of the invention, the MWD of the LLDPE fraction of the in-reactor blend is preferably at least 2 and preferably up to 8, more preferably up to 6, most preferably up to 4. The MWD of the substantially linear polyethylene or homogeneously branched linear polyethylene fraction of the in-reactor polyethylene blend is preferably at least 1 and preferably up to 6, more preferably up to 4, most preferably up to 3.

The in-reactor polyethylene blend of the third embodiment of the invention preferably has a melt index (MI) as measured by ASTM D-1238 condition 190° C./2.16 Kg (formerly known as Condition E) of at least 0.1 g/10 min., more preferably at least 0.3 g/10 min, most preferably at least 0.5 g/10 min, and in some instances, at least 1.0 g/10 min. The MI of the in-reactor blend is preferably less than 15 g/10 min, more preferably less than 10 g/10 min, further more preferably less than 6 g/10 min, most preferably less than 4 g/10 min. The in-reactor polyethylene blends preferably have a density at least 0.865 g/cm$^3$ as measured by ASTM D 792, more preferably at least 0.87 g/cm$^3$, further more preferably at least 0.88 g/cm$^3$, most preferably at least 0.90 g/cm$^3$. Preferably, the density is less than 0.96 g/cm$^3$, more preferably up to 0.95 g/cm$^3$, further more preferably up to 0.930 g/cm$^3$, most preferably up to 0.925 g/cm$^3$.

The substantially linear polyethylene or homogeneously branched linear polyethylene fraction of the in-reactor blend typically have a density of from 0.885 g/ml and 0.915 g/ml, more preferably between 0.890 g/ml and 0.910 g/ml, most preferably between 0.895 g/ml and 0.905 g/ml. Additionally, it is preferable that the substantially linear polyethylene or homogeneously branched linear polyethylene fraction have relatively high molecular weight as indicated by a melt index (MI) preferably less than 0.8 g/10 min, more preferably less than 0.5 g/10 min, further more preferably less than 0.3 g/10 min most preferably less than 0.2 g/10 min. It is believed that the high molecular weight substantially linear polyethylene or homogeneously branched linear polyethylene fractions will cause increased entanglement between the polyethylene and propylene polymer chains, which will lead to improved mechanical properties in the resulting coextruded films, including improved Elmendorf tear, puncture and dart impact compared with a coextruded film incorporating only LLDPE.

The density and melt index (MI) of the LLDPE fraction of the in-reactor polyethylene blend of the invention are of the appropriate values such that the desired MI and density of the in-reactor polyethylene blend are obtained. Preferably, the MI of the LLDPE fraction is between 0.7 g/10 min and 10.0 g/10 min, more preferably between 0.8 g/10 min and 8.0 g/10 min, most preferably between 0.8 g/10 min and 4.0 g/10 min.

The LLDPE (and the in-reactor blend described above) used in film structure is a copolymer of units derived from at least 60 percent by weight units derived from ethylene and an alpha-olefin comonomer. The preferred alpha-olefin comonomers are C4 to C10 alpha-olefins, more preferably C4-C8 alpha-olefins, further more preferably C4, C5, C6 and C8 alpha-olefins, most preferably 1-butene, 1-hexene and 1-octene. Due to their superior film strength properties (such as tear resistance, Dart impact strength and holding force, polyethylene copolymers made at least partially with Ziegler-Natta catalyst systems are preferred. In certain aspects where improved processability (bubble stability, lower extruder pressure) are critical, an in-reactor blend of a substantially linear polyethylene (or a homogeneously branched linear polyethylene) and a linear low density polyethylene copolymer is preferred. The in-reactor blends preferably are shear sensitive, having an I10/I2 ratio (190° C.) of greater than 7, preferably greater than 7.3

The LLDPE's (and the in-reactor blends) may be made using gas phase, solution, or slurry polymer manufacturing processes. Due to their excellent Elmendorf tear strength, dart impact resistance and other balance of properties, ethylene/1-octene and ethylene/1-hexene copolymers made in the solution polymerization process are most preferred. The LLDPE's utilized in the invention have a density of from 0.900 to 0.923 g/cc measured according to ASTM D 792, preferably from 0.904 to 0.922 g/cc, more preferably 0.904 to 0.920 g/cc.

Examples of suitable LLDPE's are ethylene/1-octene and ethylene/1-hexene linear copolymers available from The Dow Chemical Company under the tradename "DOWLEX", ethylene/1-octene linear copolymers available from The Dow Chemical Company under the tradename "ATTANE", ethylene/1-octene enhanced polyethylene available from The Dow Chemical Company under the tradename "ELITE", ethylene-based copolymers available from Polimeri Europa under the tradenames "CLEARFLEX" and "FLEXIRENE", ethylene/alpha-olefin copolymers available from ExxonMobil Chemical under the tradenames "Exact" and "Exceed", ethylene/alpha-olefin copolymers available from Innovex under the tradename "INNOVEX", ethylene/alpha-olefin copolymers available from Basell under the tradenames "LUFLEXEN" and "LUPOLEX", ethylene/alpha-olefin copolymers available from Dex Plastomers under the tradename "STAMYLEX", and ethylene/alpha-olefin copolymers available from Sabic under the tradename "LADENE".

Low Density Polyethylene (LDPE):

In the first and second embodiments, the LDPE typically comprises from 10 to 30 percent by weight of the total film structure. Preferably, the LDPE comprises from 12 to 28 percent by weight of the film structure, more preferably from 15 to 25 percent by weight, further more preferably from 17 to 23 percent by weight of the total film structure.

In the third embodiment, the LDPE typically comprises from 0 to 18 percent by weight of the total film structure. Preferably, the LDPE comprises from 0 to 15 percent by weight of the film structure, more preferably from 0 to 12 percent by weight, further more preferably from 0 to 9 percent by weight of the total film structure.

In the fourth and fifth embodiments, the LDPE typically comprises from 6 to 50 percent by weight of the total film structure. Where enhanced processability of the film is important, the LDPE preferably comprises from 10 to 40 percent by weight of the film structure, more preferably from 15 to 35 percent by weight of the total film structure.

The LDPE's useful in the invention are made using the high pressure free radical manufacturing process known to one of ordinary skill in the art. The LDPE's are typically homopolymers, but may contain a small amount of comonomer (less than one percent (1%) by weight units derived from comonomers. The LDPE's have a density of from 0.918 to 0.928 g/cc as measured by ASTM D 792, preferably from 0.918 to 0.926 g/cc, more preferably from 0.918 to 0.924 g/cc. The LDPE's are branched as known to one of ordinary skill in the art, which leads to excellent processibility on air-quenched blown film equipment.

The melt index ("MI") of both the LDPE described above is from 0.1 to 9 g/10 min, more preferably from 0.2 to 6 g/10 min, further more preferably from 0.2 to 4 g/10 min, most preferably from 0.2 to 2 g/10 min. Melt index (MI) measurement for polyethylene is performed according to ASTM D-1238, Condition 190° C./2.16 kilogram (kg) weight, formerly known as "Condition E" and also known as I2. Melt index is inversely proportional to the molecular weight of the polymer. Thus, the higher the molecular weight, the lower the melt index, although the relationship is not linear.

Propylene-Based Copolymer:

The propylene-based copolymer typically comprises from 30 to 70 percent by weight of the total film structure. Preferably, the propylene-based copolymer comprises from 35 to 65 percent by weight of the film structure, more preferably from 35 to 60 percent by weight, further more preferably from 35 to 55 percent by weight of the total film structure. In some instances, where elasticity is important, the propylene-based copolymer preferably comprises from 40 to 60 percent by weight, more preferably from 45 to 55 percent by weight of the total film structure.

The propylene-based copolymer of the current invention is characterized as having substantially isotactic propylene sequences. "Substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra. NMR spectra are determined as described below.

The propylene-based copolymer melt flow rate is measured by ASTM D 1238 at 230° C./2.16 kg. The melt flow rate of the propylene-based copolymer is preferably at least 0.1 g/10 min, more preferably at least 0.2 g/10 min. It is preferably up to 10 g/10 min, more preferably up to 8 g/10 min, further more preferably up to 4 g/10 min, most preferably up to 2 g/10 min to achieve good processability. One recognizes good processability by high output rates (>6 pounds per hour per inch of die circumference (0.298 g/s/cm)), preferably greater than 8 pounds per hour per inch of die circumference.

In order to enhance the elasticity of the film structure, the crystallinity of the propylene-based copolymers is at least 1 percent (a heat of fusion of at least 2 Joules/gram) is preferably less than 30 percent by weight (a heat of fusion of less than 50 Joules/gram), more preferably less than 24 percent by weight (a heat of fusion of less than 40 Joules/gram), further more preferably less than 15 percent by weight (a heat of fusion of less than 24.8 Joules/gram), and where handling is not a problem (i.e. sticky polymers can be utilized) preferably less than 7 percent by weight (a heat of fusion of less than 11 Joules/gram), even more preferably less than 5 percent by weight (a heat of fusion of less than 8.3 Joules/gram) determined in accordance with DSC method described below. The crystallinity of the propylene-based copolymers is preferably at least 2.5 percent (a heat of fusion of at least 4 Joules/gram, more preferably at least 3 percent (a heat of fusion of at least 5 Joules/gram).

The propylene-based copolymer is comprised from units derived from propylene and from polymeric units derived from alpha-olefins. The preferred comonomers utilized to manufacture the propylene-based copolymer are C2, and C4 to C10 alpha-olefins, preferably C2, C4, C6 and C8 alpha-olefins, most preferably ethylene.

The propylene-based copolymer preferably comprises from 10 to 33 mole percent units derived from the alpha-olefin comonomer, more preferably from 13 to 27 mole percent units derived from the alpha-olefin comonomer. When ethylene is the comonomer, the propylene-based copolymer preferably comprises from 9 to 16 weight percent units derived from ethylene, more preferably from 10 to 15 weight percent units derived from ethylene, further more preferably from 11 to 14 weight percent units derived from ethylene, most preferably from 11 to 13 weight percent units derived from ethylene.

$^{13}$C NMR spectroscopy is one of a number of techniques known in the art of measuring comonomer incorporation into a polymer and measuring isotactic triad levels in propylene-based copolymers. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}$C NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

The data is collected using a Varian UNITY Plus 400 MHz NMR spectrometer, corresponding to a $^{13}$C resonance frequency of 100.4 MHz. Acquisition parameters are selected to ensure quantitative $^{13}$C data acquisition in the presence of the relaxation agent. The data is acquired using gated $^1$H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Following data collection, the chemical shifts are internally referenced to the mmmm pentad at 21.90 ppm.

For propylene-ethylene copolymers, the following procedure is used to calculate the mole percent ethylene in the polymer. Integral regions are determined as follows:

TABLE A

Integral Regions for Determining % Ethylene

| Region designation | PPM |
|---|---|
| A | 44-49 |
| B | 36-39 |
| C | 32.8-34 |
| P | 31.0-30.8 |
| Q | Peak at 30.4 |
| R | Peak at 30 |
| F | 28.0-29.7 |
| G | 26-28.3 |
| H | 24-26 |
| I | 19-23 |

Region D is calculated as D = P × (G × Q)/2.
Region E = R + Q + (G × Q)/2.

TABLE E

Calculation of Region D

PPP = (F + A − 0.5 D)/2
PPE = D
EPE = C
EEE = (E − 0.5 G)/2
PEE = G
PEP = H
Moles P = sum P centered triads
Moles E = sum E centered triads
Moles P = (B + 2A)/2
Moles E = (E + G + 0.5B + H)/2

C2 values are calculated as the average of the two methods above (triad summation and algebraic) although the two do not usually vary. The weight percent of units derived from ethylene in the propylene-ethylene copolymers can be calculated from the values for mole percent ethylene by one of ordinary skill in the art.

In a particularly preferred aspect of the invention, the propylene-based copolymer utilized in the invention comprises a propylene-ethylene copolymer made using a nonmetallocene, metal-centered, heteroaryl ligand catalyst as described in U.S. patent application Ser. No. 10/139,786 filed May 5, 2002 (WO 03/040201), which are incorporated by reference herein in their entirety for their teachings regarding such catalysts. For such catalysts, the term "heteroaryl" includes substituted heteroaryl. An example of such a nonmetallocene, metal-centered, heteroaryl ligand catalyst is Catalyst A described in the Examples. The propylene-ethylene copolymers made with such nonmetallocene, metal-centered, heteroaryl ligand catalyst exhibit a unique regio-error. The regio-error is identified by $^{13}$C NMR peaks corresponding at about 14.6 and about 15.7 ppm, which are believed to be the result of stereo-selective 2,1-insertion errors of propylene units into the growing polymer chain. In this particularly preferred aspect, these peaks are of about equal intensity, and they typically represent about 0.02 to about 7 mole percent of the propylene insertions into the homopolymer or copolymer chain.

Figure 2:
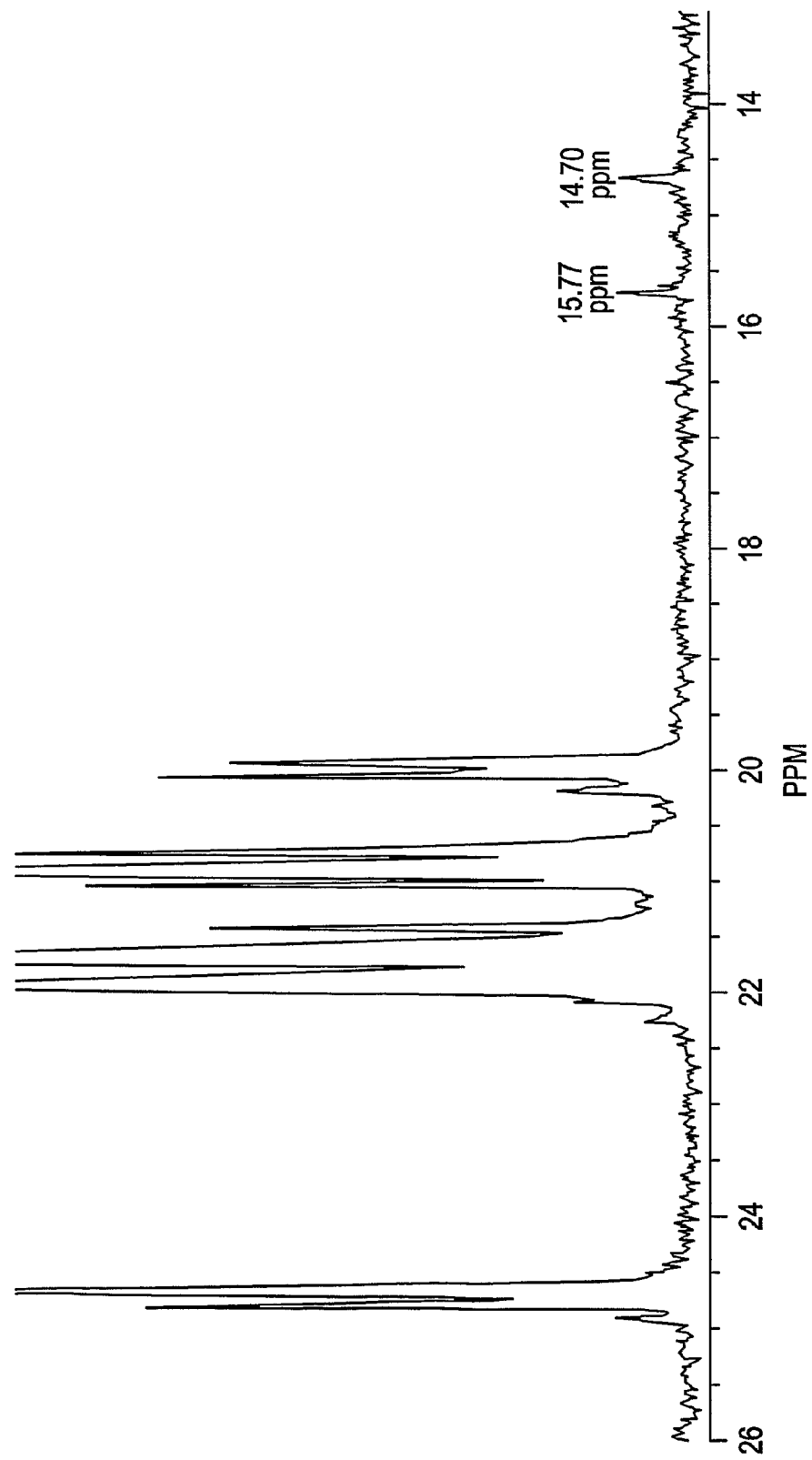
FIG. 2 shows the $^{13}$C NMR Spectrum of same propylene-ethylene copolymer as FIG. 1. However, the spectrum is shown with an expanded Y-axis scale relative to FIG. 1, in order to more clearly show the regio-error peaks at about 14.6 and 15.7 ppm.
Figure 3:
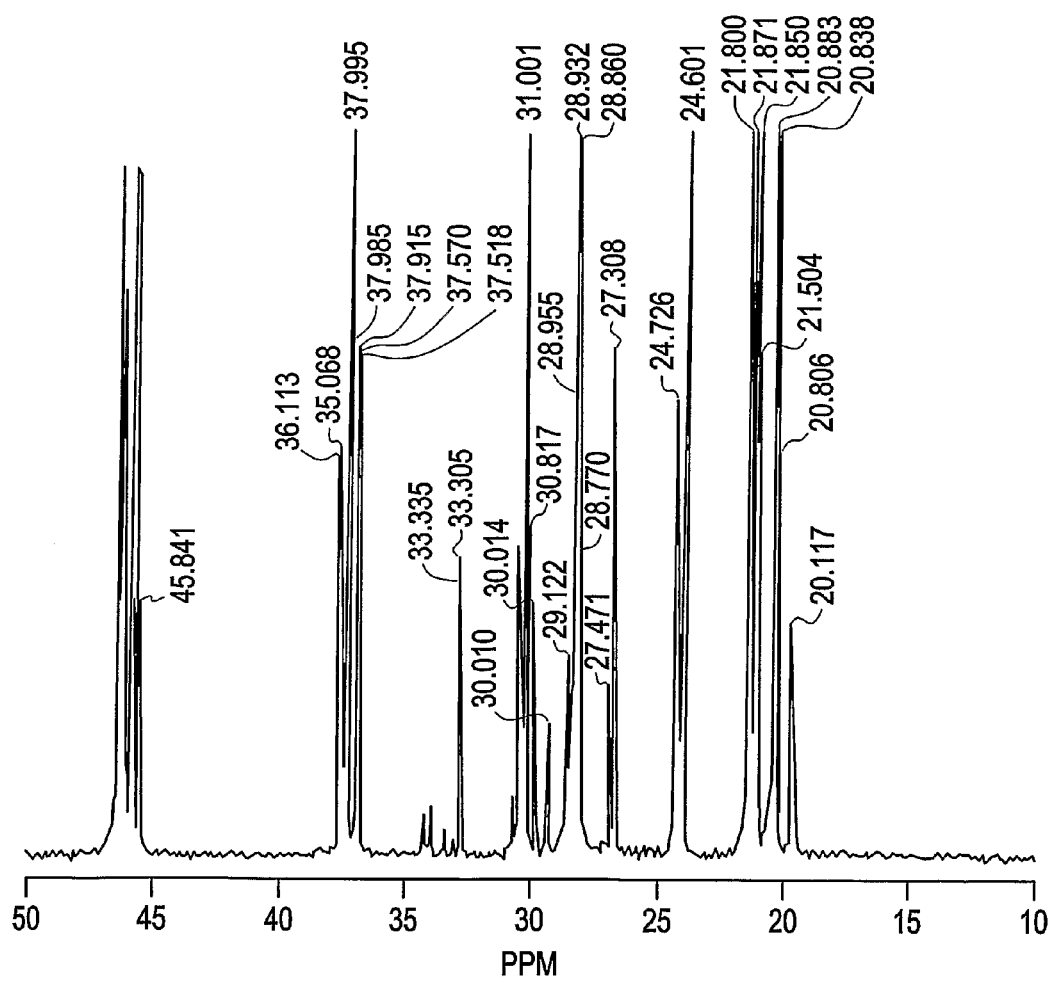
FIG. 3 shows the $^{13}$C NMR Spectrum of a propylene-ethylene copolymer prepared using a metallocene catalyst. The figure demonstrates the absence of regio-error peaks in the region around 15 ppm for a propylene-ethylene copolymer made with a metallocene catalyst.

A comparison of several $^{13}$C NMR spectra further illustrates the unique regio-errors of propylene-ethylene copolymers preferably utilized in the particularly preferred aspect of the invention. FIGS. 1 and 2 are the spectra of the propylene-ethylene copolymers similar to the propylene-ethylene copolymers utilized in the Examples. The spectrum of each polymer reports a high degree of isotacticity (isotactic triad (mm) measured by $^{13}$C NMR of greater than 0.94) and the unique regio-errors of these propylene-ethylene based copolymers. The $^{13}$C NMR spectrum of FIG. 3 is that of a propylene-ethylene copolymer prepared using a metallocene catalyst. This spectrum does not report the regio-error (around 15 ppm) characteristic of the most preferred propylene-ethylene copolymers used in this invention.

Isotacticity at the triad level (mm) is determined from the integrals of the mm triad (22.70-21.28 ppm), the mr triad (21.28-20.67 ppm) and the rr triad (20.67-19.74). The mm isotacticity is determined by dividing the intensity of the mm triad by the sum of the mm, mr, and rr triads. For ethylene copolymers the mr region is corrected by subtracting 37.5-39 ppm integral. For copolymers with other monomers that produce peaks in the regions of the mm, mr, and rr triads, the integrals for these regions are similarly corrected by subtracting the intensity of the interfering peak using standard NMR techniques, once the peaks have been identified. This can be accomplished, for example, by analysis of a series of copolymers of various levels of monomer incorporation, by literature assignments, by isotopic labeling, or other means which are known in the art.

Preferably, the propylene-based copolymer has a molecular weight distribution (MWD), defined as weight average molecular weight divided by number average molecular weight (Mw/Mn) of 3.5 or less, more preferably less 3.0, most preferably 1.8 to 3.0.

Molecular weight distribution of the polymers is determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PSI ranging from 580-7,500,000 g/mole) in conjunction with their elution volumes. The equivalent propylene-ethylene copolymer molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N.Y. Hellman, P. M. Muglia, Macromolecules, 4, 507 (1971)) in the Mark-Houwink equation:

$$\{N\} = KM^a$$

where $K_{pp}$=1.90E-04, $a_{pp}$=0.725 and $K_{ps}$=1.26E-04, $a_{ps}$=0.702.

Differential Scanning Calorimetry

Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., *Thermal Characterization of Polymeric Materials,* Academic Press, 1981). In the particularly preferred aspect of the invention, propylene-ethylene copolymers are utilized in the invention and are characterized by a DSC curve with a $T_{me}$ that remains essentially the same and a $T_{max}$ that decreases as the amount of unsaturated comonomer in the copolymer is increased. $T_{me}$ means the temperature at which the melting ends and $T_{max}$ means the peak melting temperature, both as determined by one of ordinary skill in the art from DSC analysis using data from the final heating step.

Differential Scanning Calorimetry (DSC) analysis is determined using a model Q1000 DSC from TA Instruments, Inc. Calibration of the DSC is done as follows. First, a baseline is obtained by running the DSC from –90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to –30° C. at a cooling rate of 10° C./min. The sample is kept isothermally at –30° C. for 2 minutes and heated to 30° C. at a heating rate of 10° C./min. The onset of melting is determined and checked to be within 0.5° C. from 0° C.

The propylene-based copolymers samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and the heated at a high rate of about 100° C./min to a temperature of about 30° C. above the melt temperature. The sample is kept at this temperature for about 3 minutes. Then the sample is cooled at a rate of 10° C./min to –40° C., and kept isothermally at that temperature for 3 minutes. Consequently the sample is heated at a rate of 10° C./min until complete melting. The resulting enthalpy curves are analyzed for peak melt temperature, onset and peak crystallization temperatures, heat of fusion and heat of crystallization, $T_{me}$, and any other DSC analyses of interest. The factor that is used to convert heat of fusion into nominal weight % crystallinity is 165 J/g=100 weight % crystallinity. With this conversion factor, the total crystallinity of a propylene-based copolymer (units: weight % crystallinity) is calculated as 100% times heat of fusion divided by 165 J/g.

Air Quenched Blown Film:

For stretch hood and other elastic film applications, the films preferably are from 2.00-7.10 mil thick and are made with a typical blow-up-ratio of 1.8 to 4.5. Such elastic films are capable of avoiding puncture and tearing during film forming and use and exhibit excellent holding force. In some instances, where greater holding force is important, the films preferably are from 2.75 to 7.10 mil thick and are made with a typical blow-up ratio of 1.8 to 3.5.

In addition to the other physical properties discussed earlier with respect to the film structures, in stretch hood end-use applications, the total film structure typically exhibits dart impact resistance of at least 1400 grams and Elmendorf tear strength in the machine direction (MD) of at least 420 grams and often much higher (800 grams or more of Elmendorf tear strength in the MD direction).

The technique of blown film extrusion is well known for the production of thin plastic films. Suitable air quenched blown film processes are described, for example, in *The Encyclopedia of Chemical Technology* Kirk-Othmer, Third Edition, John Wiley & Sons, New York, 1981, Vol. 16, pp. 416-417 and Vol. 18, pp. 191-192.

In an advantageous process, plastics are extruded through a circular die to form a film. Air is introduced through the center of the die to maintain the film in the form of a bubble which increases the diameter of the film 2 to 6 fold, after which the bubble is collapsed onto rollers. There are a number of variations of such a process within the skill in the art, for instance as described in such references as U.S. Pat. Nos. 3,959,425; 4,820,471, where the difference between high (referred to as "long stalk" therein) and low stalk film blowing is discussed at column 1; U.S. Pat. No. 5,284,613; W. D. Harris, et al in "Effects of Bubble Cooling on Performance and Properties of HMW-HDPE Film Resins", *Polymers, Laminations & Coatings Conference,* Book 1, 1990, pages 306-317.

In the formation of blown films, a melt enters a ring-shaped die either through the bottom or side thereof. The melt is forced through spiral grooves around the surface of a mandrel inside the die and extruded through the die opening as a thick-walled tube. The tube is expanded into a bubble of desired diameter and correspondingly decreased thickness as previously described.

The formation of coextruded blown films is known in the art and applicable to the present invention. Articles illustrative of the art include Han and Shetty, "Studies on Multilayer Film Coextrusion III. The Rheology of Blown Film Coextrusion," *Polymer Engineering and Science*, February, (1978), vol. 18, No. 3 pages 187-199; and Morris, "Peel Strength Issues in the Blown Film Coextrusion Process," 1996 *Polymers, Laminations & Coatings Conference,* TAPPI Press, Atlanta, Ga. (1996), pages 571-577. The term "coextrusion" refers to the process of extruding two or more materials through a single die with two or more orifices arranged such that the extrudates merge together into a laminar structure, preferably before chilling or quenching. Coextrusion systems for making multilayer films employ at least two extruders feeding a common die assembly. The number of extruders is dependent upon the number of different materials comprising the coextruded film. For each different material, a different extruder is advantageously used. Thus a five-layer coextrusion may require up to five extruders although less may be used if two or more of the layers are made of the same material.

Coextrusion dies are used to form coextruded blown films. They have multiple mandrels that feed the different melt streams to the circular die lip. When feedblocks are employed to stack melt layers from two or more extruders, the resulting multilayered melt stream is then fed to the film die.

Preferably, the coextruded blown films of the invention are produced at rates of at least 6 lb/hr/in of die circumference (0.298 g/s/cm of die circumference), more preferably at least 8 lb/hr/in of die circumference (0.496 g/s/cm of die circumference), most preferably at least 10 lb/hr/in of die circumference (0.695 g/s/cm of die circumference).

In multilayer films each layer advantageously imparts a desired characteristic such as weatherability, heat seal, adhesion, chemical resistance, barrier layers (e.g. to water or oxygen), elasticity, shrink, durability, hand and feel, noise or noise reduction, texture, embossing, decorative elements, impermeability, stiffness, and the like. Adjacent layers are optionally direct adhered, or alternatively may have an adhesive, tie or other layer between them, particularly for the purpose of achieving adhesion there between. Constituents of the layers are selected to achieve the desired purpose.

In the first and second embodiments of the invention, an elastic propylene-based copolymer together with an LLDPE are used for the first layer of the coextruded film. This first layer is adjacent to a second layer that is comprised of an LLDPE and a LDPE. Preferably, the first layer comprises 80 weight percent or less of the overall film structure, more preferably, the first layer comprises 70 weight percent or less of the overall film structure.

The LLDPE blended into the first layer will improve the compatibility of the first layer and the second layer. This improved compatibility combined with the toughness of the LLDPE will improve the overall mechanical properties of the film structure. In the third embodiment, when an in-reactor blend of a substantially linear polyethylene (or a homogeneously branched linear polyethylene) and a linear low density polyethylene is utilized in the second layer, then the same or a similar in-reactor blend preferably is blended into the first layer.

In a most preferred aspect of the invention, the first layer comprising a propylene-based copolymer and an LLDPE (or the in-reactor blend as described above) is sandwiched between two polyethylene containing layers. One of these sandwich layers is the second layer as described above, the other layer (or third layer) can be comprised of the polymers as the second layer described above or it can be comprised of other polymers that are chosen depending on the properties this third layer can add to the overall properties desired of the co-extruded film structure. Having a second and third layer made from the same composition is preferable for ease and simplicity of manufacturing. Also, it is believed such an A/B/A film structures (where the first layer is denoted by B and the second and third layers are the same and denoted by A) typically will provide a film exhibiting mechanical properties balance as described below. Preferably, films of the first and second embodiments of the invention have a machine direction tear resistance (MD tear) as measured according to the procedures of ASTM D 1922 of at least 115 g/mil, more preferably at least 125 g/mil, most preferably at least 175 g/mil; and a cross directional tear resistance (CD tear) as measured according to the procedures of ASTM D1922 of at least 270 g/mil, more preferably at least 290 g/mil most preferably at least 335 g/mil; and a dart impact strength as measured according to the procedures of ISO 7765-1 of at least 220 g/mil, more preferably at least 300 g/mil, most preferably at least 400 g/mil.

Preferably, films of the third embodiment of the invention have a machine direction tear resistance (MD tear) as measured according to the procedures of ASTM D1922 of at least 250 g/mil, more preferably at least 285 g/mil, most preferably at least 325 g/mil; and a cross directional tear resistance (CD tear) as measured according to the procedures of ASTM D 1922 of at least 300 g/mil, more preferably at least 340 g/mil most preferably at least 410 g/mil; and a dart impact strength as measured according to the procedures of ISO 7765-1 of at least 220 g/mil, more preferably at least 350 g/mil, most preferably at least 430 g/mil.

Preferably, films of the fourth and fifth embodiments of the invention have a machine direction tear resistance (MD tear) as measured according to the procedures of ASTM D1922 of at least 350 g/mil, more preferably at least 400 g/mil, most preferably at least 450 g/mil; and a cross directional tear resistance (CD tear) as measured according to the procedures of ASTM D1922 of at least 400 g/mil, more preferably at least 450 g/mil most preferably at least 500 g/mil; and a dart impact strength as measured according to the procedures of ASTM D-1709 (Type B) of at least 275 g/mil, more preferably at least 300 g/mil, most preferably at least 350 g/mil. Where elasticity and stretchability of the film is important, the first layer preferably is sandwiched between two second layers, each second layer preferably containing at least 10 percent by weight of the propylene-based copolymer, the films exhibiting an elastic recovery after a 200% strain of at least 75% in the cross-direction, preferably at least 78%. These films exhibit a final holding force in the alternate stretch hood test of at least 375 $lbf/in^2$, preferably at least 400 $lbf/in^2$ (after a "high" stretch (200%-175%) test) and/or 375 $lbf/in^2$ (after a "normal" stretch (160%-140%) test). Where processability of the film is critical, the first layer preferably is sandwiched between two second layers, each second layer preferably containing at least 10 percent by weight of low density polyethylene (LDPE), the film structure exhibiting an elastic recovery after a 200% strain of at least 75%, preferably at least 78% in the cross direction. These films exhibit a final holding force in the alternate stretch hood test of at least 450 $lbf/in^2$, preferably at least 475 $lbf/in^2$ (after a "high" stretch (200%-175%) test) and/or 450 $lbf/in^2$ (after a "normal" stretch (160%-140%) test).

Films of the first three embodiments of the invention exhibit an elastic recovery after a 200% strain of at least 78%, preferably at least 82%, more preferably at least 84%. Films of the first three embodiments exhibit a final holding force in the "stretch hood test" (described below) of at least 700 $lbft/inch^2$, preferably at least 730 $lbft/inch^2$ (after a "high" stretch (200%-175%) test) and/or at least 363 $lbft/inch^2$ (after a "normal" stretch (160%-140%) test). Films of the fourth and fifth embodiments, exhibit an elastic recovery after a 200% strain of at least 75%, preferably at least 78, more preferably at least 80%. Films of the fourth and fifth embodiments exhibit a final holding force in the "alternate stretch hood test" (described below) of at least 350 $lbf/in^2$, preferably at least 400 $lbf/in^2$ (after a "high" stretch (200%-175%) test) and/or 400 $lbf/in^2$ (after a "normal" stretch (160%-140%) test).

Additives

Additives are optionally included in compositions of the invention. Additives are well within the skill in the art. Such additives include, for instance, stabilizers including free radical inhibitors and ultraviolet wave (UV) stabilizers, neutralizers, nucleating agents, slip agents, antiblock agents, pigments, antistatic agents, clarifiers, waxes, resins, fillers such as silica and carbon black and other additives within the skill in the art used in combination or alone. Effective amounts are known in the art and depend on parameters of the polymers in the composition and conditions to which they are exposed.

As is known to one of skill in the art, antiblock additives are additives that when added to polymer films minimize the tendency of the film to stick to another film or itself during manufacturing, transport and storage. Typical materials used as antiblocks include silica, talc, clay particles, and other substances known to one of ordinary skill in the art.

As is known to one of skill in the art, slip additives are additives that when added to polymer films lower the coefficient of friction of the film. Typical materials used as slip agents include erucamide, oleamide, and other substances known to one of ordinary skill in the art.

Uses:

In a most preferred aspect of the invention, the inventive film structures are used in Stretch Hood applications. A stretch hood is a packaging hood which is formed from a tubular film (gusseted or non-gusseted). Preferably, the film is gusseted. When utilized the stretch hood is typically opened out over four "stretching arms", stretched to a greater size than the article to be covered. The hood is then placed over said article (while applying stretch in the direction of application) and the arms are removed. The inherent elasticity of the film causes it to contract back around the article, thereby providing 5-sided protection and a certain load holding force. The stretch hoods are particularly useful for unitizing pallets of goods.

The film structure of the current invention makes an excellent stretch hood due to the fact that it provides: even stretching; good elasticity (to conform well around the wrapped article); good Dart Impact resistance (to avoid holing or puncturing the film on the pallet corners or on sharp areas of the article); good tear resistance (so that any holes that do form do not propagate into tears); and good holding force.

Testing Methods

For the examples below, unless otherwise indicated: for propylene-based copolymers melt flow rate (MFR) is measured in accordance with ASTM D 1238, at a temperature of 230 C under a weight of 2.16 kg; for polyethylenes melt index (MI) is measured in accordance with ASTM D 1238, at a temperature of 190 C under a weight of 2.16 kg; melt index ratio (I10/I2) is measured in accordance with ASTM D 1238 at a temperature of 190° C. taking the ratio of values obtained at 10 kg and 2.16 kg. Dart impact is measured in accordance with ISO 7765-1 (method A) for the first three embodiments, and ASTM D-1709 (type B) for the fourth and fifth embodiments; and Elmendorf tear is measured in accordance with ASTM D-1922 (type B).

Elastic recovery is measured by placing a single ply of film, 0.59 mil wide, cut in the transverse direction, into an Instron tensiometer equipped with a strain cell and integrated digital display that provides force determinations. The film is stretched to 200% of its original length at 96.5 inch/min, held for 20 seconds, then the force is released and the film length measured again after 600 seconds. The elastic recovery (in percent) is defined to be the final film length divided by the original film length multiplied by 100.

"Stretch Hood Test"—to mimic the performance of a typical stretch hood application cycle, a tensile test is run on a typical Instron tensiometer. This test holds a sample of the film, 0.59 mil wide, cut in the cross direction, between two clamps. The film is initially stretched to a pre-defined strain level (either 200% (high) or 160% (normal) of the original length) at 96.5 inch/min. The sample is then held at this strain level for 60 seconds, after which it is relaxed back to a lower strain level (either 175% (high) or 140% (normal) of the original length) at the same speed as the original stretch. The sample is then held for 3 minutes to allow for the build-up of the elastic recovery force to a relatively stable level. The final holding force is recorded after the 3 minute wait period. To normalize results for films of different thickness, the force is quoted per unit area of film (i.e. in lbft/in$^2$).

"Alternate Stretch Hood Test"—to mimic the performance of a typical stretch hood application cycle, a tensile test is run on a typical Instron tensiometer. This test holds a sample of the film, 1 inch wide, cut in the cross direction, between two clamps (at a distance of 5 inches). The film is initially stretched to a pre-defined strain level (either 200% (high) or 160% (normal) of the original length) at 40 inch/min. The sample is then held at this strain level for 15 seconds, after which it is relaxed back to a lower strain level (either 175% (high) or 140% (normal) of the original length) at the same speed as the original stretch. The sample is then held for 30 minutes to allow for the build-up of the elastic recovery force to a relatively stable level. The final holding force is recorded after the 30 minute wait period. To normalize results for films of different thickness, the force is quoted per unit area of film (i.e. in lbf/in$^2$).

Blending of the Components:

The compositions incorporated into the film can be made by: (a) dry Blending of the component pellets; (b) direct feeding of the component pellets via a blender system (volumetric or gravimetric) mounted on an extruder; (c) compounding the pellet components in a compounding extruder producing pellets of compounded product; and/or (d) any other blending techniques known to one of ordinary skill in the art.

EXAMPLES

Catalyst A

Synthesis of Catalyst A

Hafnium, [N-[2,6-bis(1-methylethyl)phenyl]-α-[2-(1-methylethyl)phenyl]-6-(1-naphthanlenyl-κ-C$^2$)-2-pyridinemethanaminato(2-)-κN$^1$, κN$^2$]dimethyl-

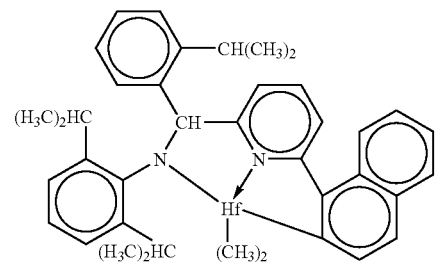

a) 2-Formyl-6-bromopyridine

This compound is synthesized according to literature procedures, *Tetrahedron Lett.*, (2001) 42, 4841.

b) 6-Bromo-2-(2,6-diisopropylphenyl)iminopyridine)

A dry, 500 mL 3-neck round bottom flask is charged with a solution of 2-formyl-6-bromopyridine (72.1 g, 383 mmol) and 2,6-diisopropylaniline (72.5 g, 383 mmol) in 500 mL of anhydrous toluene containing 0.3 nm pore size molecular sieves (6 g) and 80 mg of p-TsOH. The reactor is equipped with a condenser, an over head mechanical stirrer and a thermocouple well. The mixture is heated to 70° C. under N$_2$ for 12 h. After filtration and removal of the volatiles under reduced pressure, a brown oil is isolated. Yield was 109 g, 81.9 percent.

GC/MS 346 (M$^+$), 331, 289, 189, 173, 159, 147, 131, 116, 103, 91, 78.

c) 6-(1-Naphthyl)-2-[(2,6-diisopropylphenyl)imino]pyridine

Naphthylboronic acid (54.5 g, 316 mmol) and Na$_2$CO$_3$ (83.9 g, 792 mmol) are dissolved into 200 mL of degassed 1:1

H₂O/EtOH. This solution is added to a toluene solution (500 mL) of 6-bromo-2-(2,6-diisopropylphenyl)-iminopyridine (109 g, 316 mmol). Inside of a dry box, 1 g (0.86 mmol) of tetrakis(triphenyl-phosphine)palladium(0) is dissolved in 50 mL of degassed toluene. The solution is removed from the dry box and charged into the N₂ purged reactor. The biphasic solution is vigorously stirred and heated to 70° C. for 4-12 hours. After cooling to room temperature, the organic phase is separated, the aqueous layer is washed with toluene (3×75 mL), the combined organic extracts are washed with H₂O (3×200 mL) and dried over MgSO₄. After removing the volatiles under reduced pressure, the resultant light yellow oil is purified via recrystallization from methanol to give a yellow solid. Yield 109 g, 87.2 percent; mp 142-144° C.

$^1$H NMR (CDCl₃) δ 1.3 (d, 12H), 3.14 (m, 2H), 7.26 (m, 3H), 7.5-7.6 (m, 5H), 7.75-7.8 (m, 3H), 8.02 (m 1H), 8.48 (m, 2H).

$^{13}$C NMR (CDCl₃) δ 23.96, 28.5, 119.93, 123.50, 124.93, 125.88, 125.94, 126.49, 127.04, 127.24, 128.18, 128.94, 129.7, 131.58, 134.5, 137.56, 137.63, 138.34, 148.93, 154.83, 159.66, 163.86.

GC/MS 396 (M$^{30}$), 380, 351, 337, 220, 207, 189, 147.

d) 2-Isopropylphenyl lithium

Inside an inert atmosphere glovebox, n-butyl lithium (52.5 mmol, 21 mL of 2.5M in hexanes) is added by addition funnel over a period of 35-45 min to an ether solution (50 mL) of 2-isopropyl bromobezene (9.8 g, 49.2 mmol). After the addition is complete, the mixture is stirred at ambient temperature for 4 h. Then, the ether solvent is removed under vacuum overnight. The next day hexane is added to the remaining white solid and the mixture filtered, washed with additional hexane, and then vacuum dried. 2-Isopropylphenyl lithium (4.98 g, 39.52 mmol) is collected as a bright white powder. A second crop of product (0.22 g) is later obtained from a second filtration of the original hexane filtrant.

$^1$H NMR (d₈-THF) δ 1.17 (d, J=6.8 Hz, 6H), 2.91 (sept, J=6.8, 1H), 6.62-6.69 (multiplets, 2H), 6.77 (d, J=7.3 Hz, 1H), 7.69 (multiplet, 1H).

$^{13}$CNMR (d₈-THF) δ 25.99, 41.41, 120.19, 122.73, 122.94, 142.86, 160.73, 189.97.

e) 2-pyridinemethanamine, N-[2,6-bis(1-methylethyl)phenyl]-α-[2-(1-methylethyl)phenyl]-α-(1-naphthanlenyl)

The imine, 6-(1-naphthyl)-2-[(2,6-diisopropylphenyl)imino]pyridine of step c) (2.20 g, 5.6 mmol) is magnetically stirred as a slurry in 60-70 mL of dry ether under a nitrogen atmosphere. An ether solution of 2-isopropylphenyl lithium (1.21 g, 9.67 mmol in 25 mL dry ether) is added slowly using a syringe over a period of 4-5 min. After the addition is complete, a small sample is removed, quenched with 1N NH₄Cl and the organic layer analyzed by high pressure liquid chromatography (HPLC) to check for complete consumption of starting material. The remainder of the reaction is quenched by the careful, slow addition of 1N NH₄Cl (10 mL). The mixture is diluted with more ether and the organic layer washed twice with brine, dried (Na₂SO₄), filtered, and stripped of solvent under reduced pressure. The crude product obtained as a thick red oil (2.92 g; theoretical yield=2.87 g) is used without further purification.

$^1$H NMR (CDCl₃) δ 0.96 (d, J=6.6 Hz, 3H), 1.006 (d, J=6.8 Hz, 3H), 1.012 (d, J=6.8 Hz, 6H), 1.064 (d, J=6.8 Hz, 6H), 3.21-3.34 (multiplets, 3H), 4.87 (br s, NH), 5.72 (s, 1H), 6.98 (d, J=7.6 Hz, 1H) 7.00-7.20 (multiplets, 7H), 7.23-7.29 (multiplets, 4H), 7.51 (d, J=7.1 Hz 1H), 7.60-7.65 (multiplets, 2H), 7.75 (multiplet, 1H), 8.18 (multiplet, 1H).

$^{13}$C NMR (CDCl₃) δ 23.80, 24.21, 24.24, 24.36, 28.10, 28.81, 67.08, 120.20, 122.92, 123.96, 124.42, 125.35, 125.81, 126.01, 126.28, 126.52, 126.58, 126.65, 127.80, 128.52, 128.62, 129.25, 131.82, 134.52, 136.81, 138.82, 140.94, 143.37, 143.41, 146.66, 159.05, 162.97.

f) Hafnium, [N-[2,6-bis(1-methylethyl)phenyl]-α-[2-(1-methylethyl)phenyl]-6-(1-naphthanlenyl-κ-C²)-2-pyridinemethanaminato(2-)-κN¹,κN²]dimethyl- A glass jar is charged with 8.89 mmol of the ligand from step e) dissolved in 30 mL toluene. To this solution is added 8.98 mmol of n-BuLi (2.5 M solution in hexanes) by syringe. This solution is stirred for 1 hour, then 8.89 mmol of solid HfCl₄ are added. The jar is capped with an air-cooled reflux condenser and the mixture is heated at reflux for 1 hour. After cooling, 31.1 mmol of MeMgBr (3.5 equivalents, 3.0 M solution in diethyl ether) are added by syringe and the resulting mixture stirred overnight at ambient temperature. Solvent (toluene, hexanes and diethyl ether) is removed from the reaction mixture using a vacuum system attached to the drybox. Toluene (30 mL) is added to the residue and the mixture filtered, and the residue (magnesium salts) is washed with additional toluene (30 mL). Solvent is removed by vacuum from the combined toluene solution, and hexane is added, then removed by vacuum. Hexane is again added and the resulting slurry is filtered and the product washed with pentane to give the desired product as a yellow powder.

$^1$H NMR (C₆D₆): δ 8.58 (d, J=7.8 Hz, 1H), 8.25 (d, J=8.4 Hz, 1H), 7.82 (d, J=7.5 Hz, 1H), 7.72 (d, J=6.9 Hz, 1H), 7.50 (d, J=8.1 Hz, 1H), 7.36-7.27 (multiplets, 3H), 7.19-6.99 (multiplets, 7H), 6.82 (t, J=8.1 Hz, 1H), 6.57 (s, 1H), 6.55 (d, J=7.8 Hz, 1H), 3.83 (septet, J=6.9 Hz, 1H), 3.37 (septet, J=6.9 Hz, 1H), 2.89 (septet, J=6.9 Hz, 1H), 1.38 (d, J=6.6 Hz, 3H), 1.37 (d, J=6.9 Hz, 3H), 1.17 (d, J=6.9 Hz, 3H), 1.15 (d, J=7.2 Hz, 3H), 0.96 (s, 3H), 0.70 (s, 3H), 0.69 (d, J=5.4 Hz, 3H), 0.39 (d, J=6.9 Hz, 3H).

General Continuous Loop Solution
Propylene-Ethylene Copolymerization Procedure

Propylene-ethylene copolymers of the examples can be made according to the following procedure. Catalyst A.

The polymerization process is exothermic. There are ~900 BTU released per pound of propylene polymerized and ~1,500 BTU released per pound of ethylene polymerized. The primary process design consideration is how to remove the heat of reaction. The propylene-ethylene copolymers are produced in a low-pressure, solution polymerization loop reactor, made up of a 3" loop pipe plus two heat exchanges, the total volume of which is 31.4 gals. Solvent and monomer (propylene) are injected into the reactor as a liquid. The comonomer (ethylene) gas is fully dissolved in the liquid solvent. The feed is cooled to 5° C. before injection into the reactor. The reactor operates at polymer concentrations equal to 18 wt %. The adiabatic temperature rise of the solution accounts for some of the heat removal from the polymerization reaction. Heat exchangers within the reactor are utilized to remove the remaining heat of reaction, allowing for reactor temperature control at 105° C.

The solvent used is a high purity iso-paraffinic fraction purchased from Exxon called Isopar E. Fresh propylene is passed through a bed of Selexsorb COS for purification before mixing with the recycle stream (contains solvent, propylene, ethylene, and hydrogen). After mixing with the recycle stream, the combined stream is passed through a bed of 75 wt % Molecular Sieve 13X and 25 wt % Selexsorb CD for further purification before using a high pressure (700 psig) feed pump to pump the contents to the reactor. Fresh ethylene is passed through a Selexsorb COS bed for purification before compressing the stream to 750 psig. Hydrogen (a telogen used to reduce molecular weight) is mixed with the compressed ethylene before the two are mixed/dissolved into the liquid feed. The total stream is cooled to the appropriate feed temperature (5° C.). The reactor operates at 525 psig and a control temperature equal to 105° C. The propylene conversion in the reactor is maintained by controlling the catalyst injection rate. The reaction temperature is maintained by controlling the water temperature across the shell side of the heat exchanger at 85° C. The residence time in the reactor is short, 10 minutes. The propylene conversion per reactor pass is 60 wt %.

Upon exiting the reactor, water and additive are injected into the polymer solution. The water hydrolyzes the catalyst, terminating the polymerization reaction. The additives consist of antioxidants, 500 ppm of Irganox™ 1010 and 1000 ppm of Irgafos™ 168, that remain with the polymer and act as stabilizers to prevent polymer degradation while in storage before subsequent fabrication at the end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block flare and burned. Propylene-ethylene copolymers made according to the above described process may be utilized for the propylene alpha olefin copolymers of the invention.

The term "mechanical properties balance" is used to mean good toughness as measured by Elmendorf tear strength greater than 115 g/mil in machine direction (MD) and 270 g/mil in cross direction (CD); together with elastic recovery, in the cross direction, after elongation to 200% of original length of at least 78%; Dart impact (according to ISO 7765-1 (method A)) equal to or greater than 220 g/mil; and final holding force in the stretch hood test of at least 700 lbft/inch$^2$ (after a 200%-175% test) and/or 363 lbft/inch$^2$ (after a 160%-140% test).

Polymer Resins

The resins used in the examples are described below.

1. LDPE-1: 0.25 g/10 min melt index (MI), 0.921 g/ml density, MWD of 4.8, low density polyethylene homopolymer resin, prepared using a high pressure radical production process, commercially available from The Dow Chemical Company as grade LDPE 150E.
2. LDPE-2: 0.22 g/10 min melt index (MI), 0.924 g/ml density, MWD of 7.7, low density polyethylene homopolymer resin, prepared using a high pressure radical production process, commercially available from The Dow Chemical Company as grade LDPE 132I.
3. LLDPE-1: 1.0 g/10 min melt index (MI), 0.905 g/ml density, MWD of 4.2, linear low density polyethylene copolymer comprising 15 percent by weight units derived from 1-Octene comonomer, prepared using a Ziegler-Natta type catalyst and a solution polymerization process, commercially available from The Dow Chemical Company under the trademark ATTANE SL4102G.
4. Polyethylene Blend A, a 0.85 g/10 min melt index (MI), 0.920 g/ml density in-reactor blend having an I10/I2 of about 8.2 consisting of: (a) 38 wt % of a substantially linear ethylene/1-octene copolymer having a 0.2 g/10 min melt index (I2) and a density of 0.900 g/ml, prepared using a CGC type catalyst and a solution process; and (b) 62 wt % of a Ziegler-Natta catalyzed (solution process) ethylene/1-octene LLDPE having a 2.9 g/10 min melt index (I2) and a density of 0.933 g/ml density.
5. EVA Copolymer-1: 0.65 g/10 min melt index (MI), 0.942 g/ml density, ethylene vinyl acetate copolymer containing 19 weight percent vinyl acetate comonomer, prepared in the high pressure radical production process, commercially available from Exxon Mobil Chemical Company under the trade name Escorene FL00119.
6. Propylene-based copolymer made using Catalyst A using a polymerization method similar to the polymerization method described below. The propylene-based copolymer has a molecular weight distribution of less than 3.5, a melt flow rate of 2 g/10 min, an ethylene content of 12 weight percent, a density of 0.866 g/ml, and a heat of fusion of 29 Joules/gram.
7. LLDPE-2: 0.85 g/10 min melt index (MI), 0.918 g/ml density, MWD of 4.2, linear low density polyethylene copolymer comprising 9 percent by weight units derived from 1-Hexene comonomer, prepared using a Ziegler-Natta type catalyst and a solution polymerization process, commercially available from The Dow Chemical Company under the trademark DOWLEX 2645G.
8. EVA Copolymer-2: 0.7 g/10 min melt index (MI), 0.948 g/ml density, ethylene vinyl acetate copolymer containing 18 weight percent vinyl acetate comonomer, prepared in the high pressure free radical production process, commercially available from AT Plastics under the trade name Ateva 1807.
9. EVA Copolymer-3: 0.3 g/10 min melt index (MI), 0.930 g/ml density, ethylene vinyl acetate copolymer containing 6 weight percent vinyl acetate comonomer, prepared in the high pressure free radical production process, commercially available from AT Plastics under the trade name Ateva 1066BA.

Film Production Methods

Example 1

A three layer film structure (A:B:A) is used for the coextruded films of Table 1. These film structures are made as described below. The three layer film structures are made on a blown film coextrusion line where Layer "B" (core layer) is extruded through an 8.0 inch (20.32 cm) diameter multi-channel annular die using 2.56 inch (6.5 cm) diameter grooved barrel extruder with a L/D ratio of 30:1 and a general purpose type barrier screw with Maddock and cavity transfer mixing tips. Layer B is made from 70 weight percent of either the propylene based copolymer ("Inventive Coex") or the EVA Copolymer-1 ("Comparative Coex") and 30 weight percent LLDPE-1; Layers "A" the outer layers are extruded through an 8.0 inch (20.32 cm) diameter multi-channel annular die using 1.97 inch (5 cm) diameter grooved barrel extruders with a L/D ratios of 30:1 and general purpose type barrier screws with cavity transfer mixing tips. Layers A are made from a blend of approximately 70 weight percent LDPE-1 and 30 weight percent LLDPE-1 and 7000 ppm of an anti-block (calcium carbonate). The total configuration is set for a target output of 253 pounds/hour (115 kg/hr). The weight output ratio of the extruders is targeted at 15%/70%/15% for the A/B/A extruders. Typical polymer melt temperatures range from 400° F. to 473° F. for the polymers that comprise layers A/B/A. A 98 mil die gap is used. The produced films are air blown to a 3:1 blow-up ratio (BUR) and air-quenched to produce the three layer A/B/A multilayer film.

TABLE 1

| 64532A | Inventive Coex A/B/A | Comparative Coex A/B/A |
|---|---|---|
| Avg Thickness, (mils) | 3.43 mil | 3.46 mil |
| Final Holding Force after "Stretch Hood Test" at high (200%-175%) stretch (lbft/in2) | 743 | 769 |
| Dart Impact g/mil (ISO 7765-1(method A)) | 436 | 324 |
| Avg Elmendorf Tear MD g/mil | 127 | 110 |
| Avg Elmendorf Tear CD g/mil | 295 | 266 |
| Elastic Recovery after stretch to 200% of original length (%) | 84 | 82 |

Table 1 shows the properties for the films produced. As can be seen from Table 1, the inventive coextruded film structure exhibits excellent elastic recovery, Dart Impact, Elmendorf Tear, and final holding force in the stretch hood test, which exceeds the comparative coextruded film structure utilizing EVA in place of the propylene-based copolymer.

Example 2

A three layer A/B/A structure is produced according to the same conditions as described in example 1 except that the weight ratio of layers is 20/60/20, the blow up ratio is 2.5:1 and the total material output is 242 lb/hr.

Layer B is made using 75 weight percent of the propylene based copolymer and 25 weight percent Polyethylene Blend A.

Layers A are made from Polyethylene Blend A plus 3000 ppm silica antiblock additive.

Table 2 shows a comparison of this film with a market standard high performance stretch hood film based on a core layer of EVA copolymer (obtained directly from the market place) As can be seen from Table 2, the inventive film structure exhibits an excellent balance of physical properties compared to the commercially available films. In particular, the inventive film structure exhibits much higher Elmendorf Tear strength (in both the CD and MD direction), while providing excellent Dart impact resistance, elastic recovery, and holding force.

TABLE 2

| | Inventive Coex A/B/A | Market Standard Film (EVA based) |
|---|---|---|
| Avg Thickness, (mils) | 3.71 Mil | 4.2 mil |
| Final Holding Force after "Stretch Hood Test" at normal (160%-140%) stretch (lbft/in2) | 399 | 391 |
| Dart Impact g/mil (ISO 7765-1 (method A)) | 509 | Not measured |
| Avg Elmendorf Tear MD g/mil | 361 | 50 |
| Avg Elmendorf Tear CD g/mil | 472 | 110 |
| Elastic Recovery following stretch hood test above* | 89 | Not measured |

*Sample taken from stretch hood test, left to stand for 5 min then length measured Example 3

A three layer film structure ($A_1$:B:$A_2$) is used for the coextruded films of Table 3. These film structures are made as described below. The three layer film structures are made on a blown film coextrusion line where Layer "B" (core layer) is extruded through an 6.0 inch (15.24 cm) diameter multi-channel annular die using 2.5 inch (6.35 cm) diameter smooth barrel extruder with a L/D ratio of 24:1 and a Davis Standard DSB II barrier screw with Maddock mixer. Layer B is made from 75 weight percent of the propylene based copolymer and 30 weight percent LDPE-2 ("Inventive Coex"); or 100% of the EVA Copolymer-2 ("Comparative Coex"); Layers "$A_1$ & $A_2$" the outer layers are extruded through an 6.0 inch (15.24 cm) diameter multi-channel annular die using: for layer "$A_1$" (inside) one 2 inch (5.08 cm) diameter smooth barrel extruder with a L/D ratio of 24:1 and general purpose type barrier screw with a Maddock mixer; for layer "$A_2$" (outside) one 2.5 inch (6.35 cm) diameter smooth barrel extruder with a L/D ratio of 24:1 and general purpose type barrier screw with a twisted Egan/Z mixer. Layers $A_1$ & $A_2$ are made from 100 weight percent LLDPE-2. The total configuration is set for a target output of 175 pounds/hour (79.4 kg/hr). The weight output ratios of the extruders is targeted at 20%/60%/20% for the $A_1$/B/$A_2$ extruders. Typical polymer melt temperatures range from 400° F. to 473° F. for the polymers that comprise layers $A_1$/B/$A_2$. A 70 mil die gap is used. The produced films are air blown to a 2.5 to 3:1 blow-up ratio (BUR) and air-quenched to produce the three layer $A_1$/B/$A_2$ multilayer film.

Table 3 shows the properties for the films produced for Example 3. As can be seen from Table 3, the inventive coextruded film structure exhibits excellent Dart impact, Elmendorf tear, and final holding force in the stretch hood test, which exceeds the comparative coextruded film structure utilizing EVA in the core layer of the structure. The films are also expected to exhibit excellent elastic recovery in the cross direction since they show good holding force in the high and normal alternative stretch hood test.

TABLE 3

| | Comparative Coex | Inventive Coex $A_1$/B/$A_2$ |
|---|---|---|
| Film Thickness (mil) | 3.84 | 4.01 |
| Blow up Ratio | 2.5 | 3.0 |
| "Alternate Stretch Hood Test" High (200%-175%) Stretch Final Holding Force (lbf/in²) | 468 | 409 |
| "Alternate Stretch Hood Test" Normal (160%-140%) Stretch Final Holding Force (lbf/in²) | 493 | 421 |
| Dart Impact - B (g/mil) | 246 | 374 |
| CD Elmendorf Tear (g/mil) | 391 | 530 |
| MD Elmendorf Tear (g/mil) | 285 | 458 |

Example 4

A three layer film structure ($A_1$:B:$A_2$) is used for the coextruded films of Table 4. These film structures are made as described below. The three layer film structures are made on a blown film coextrusion line where Layer "B" (core layer) is extruded through an 6.0 inch (15.24 cm) diameter multi-channel annular die using 2.5 inch (6.35 cm) diameter smooth barrel extruder with a L/D ratio of 24:1 and a Davis Standard DSB II barrier screw with Maddock mixer. Layer B is made from 50 weight percent of the propylene based copolymer and 50 weight percent LDPE-2 ("Inventive Coex"); or 100% of the EVA copolymer 3 ("Comparative Coex"); Layers "$A_1$ & $A_2$" the outer layers are extruded through an 6.0 inch (15.24 cm) diameter multi-channel annular die using: for layer "$A_1$"

(inside) one 2 inch (5.08 cm) diameter smooth barrel extruder with a L/D ratio of 24:1 and general purpose type barrier screw with a Maddock mixer; for layer "A$_2$" (outside) one 2.5 inch (6.35 cm) diameter smooth barrel extruder with a L/D ratio of 24:1 and general purpose type barrier screw with a twisted Egan/Z mixer. Layers A$_1$ & A$_2$ are made from 100 weight percent LLDPE-2. The total configuration is set for a target output of 175 pounds/hour (79.4 kg/hr). The weight output ratios of the extruders is targeted at 20%/60%/20% for the A$_1$/B/A$_2$ extruders. Typical polymer melt temperatures range from 400° F. to 473° F. for the polymers that comprise layers A$_1$/B/A$_2$. A 70 mil die gap is used. The produced films are air blown to a 2.5 to 3:1 blow-up ratio (BUR) and air-quenched to produce the three layer A$_1$/B/A$_2$ multilayer film.

Table 4 shows the properties for the films produced for Example 4. The films were tested using the alternate stretch hood test. As can be seen from Table 4, the inventive coextruded film structure exhibits excellent Dart Impact, Elmendorf Tear, and final holding force in the stretch hood test, which exceeds the comparative coextruded film structure utilizing EVA in the core layer of the structure. The films are also expected to exhibit excellent elastic recovery in the cross direction since they show good holding force in the high and normal alternative stretch hood test.

TABLE 4

| | Comparative Coex | Inventive Coex A$_1$/B/A$_2$ |
|---|---|---|
| Film Thickness (mil) | 3.88 | 4.09 |
| Blow up Ratio | 2.5 | 3.0 |
| "Alternate Stretch Hood Test" High (200%-175%) Stretch Final Holding Force (lbf/in$^2$) | 529 | 501 |
| "Alternate Stretch Hood Test" Normal (160%-140%) Stretch Final Holding Force (lbf/in$^2$) | 584 | 498 |
| Dart Impact - B (g/mil) | 131 | 164 |
| CD Elmendorf Tear (g/mil) | 237 | 375 |
| MD Elmendorf Tear (g/mil) | 153 | 268 |

We claim:

1. A multi-layer elastic air quenched blown film structure, the film comprising:
   A. A first layer comprising from 40 to 80 percent by weight of the film structure, the first layer comprising:
      (1) from 50 to 85% by weight of a propylene-based copolymer having substantially isotactic propylene sequences, the propylene-based copolymer comprising from 84 to 91 percent by weight units derived from propylene and from about 9 to about 16 percent by weight units derived from ethylene, the propylene-based copolymer having a melt flow rate (MFR) of from 0.1 to 10 g/10 min, a heat of fusion of from 2 to 50 Joules/gram, a molecular weight distribution (Mw/Mn) of less than 4, and a density of from 0.855 to 0.876 g/ml; and (2) from 50 to 15 percent by weight of an linear low density polyethylene copolymer having a melt index (MI) from 0.1 to 10 g/10 minutes and a density of from 0.900 to 0.923 g/ml; and
   B. A second layer comprising from 10 to 30 percent by weight of the film structure, the second layer comprising: (1) from 55 to 85 percent by weight of a low density polyethylene having a density of from 0.918 to 0.928 g/ml and having a melt index (MI) of from 0.1 to 9; and
      (2) from 15 to 45 percent by weight of a linear low density polyethylene copolymer having a density of from 0.900 to 0.923 g/ml and a melt index (MI) of from 0.1 to 10 g/10 minutes; and
   (3) optionally, from 1000 to 20,000 ppm anti-block additive, the film structure exhibiting: (a) a dart impact value of at least 220 g/mil according to ISO 7765-1, (b) an Elmendorf tear strength of at least 115 g/mil in the machine direction according to ASTM D-1922, (c) an Elmendorf tear strength of at least 270 g/mil in the cross direction according to ASTM D-1922, an (d) elastic recovery of at least 78 percent in cross direction after being extended to a strain of 200 percent its original length, and (e) a final holding force in a stretch hood test of at least 700 lbft/inch$^2$ (after a high stretch (200%-175%) test).

2. The film structure of claim 1, the film structure having a core layer comprised of the first layer A and two outer layers, wherein at least one of the outer layers is comprised of the second layer B.

3. The film structure of claim 2, where the film structure has a core layer comprised of the first layer A, sandwiched between two second layers B.

4. The film structure of claim 1, wherein the film structure exhibits a final holding force in a stretch hood test of at least 730 lbft/inch$^2$ after a high stretch (200%-175%) test.

5. The film structure of claim 1, wherein the film structure exhibits a final holding force in a stretch hood test of at least 363 lbft/inch$^2$ after a normal stretch (160%-140%) test.

6. The film structure of claim 1, wherein the propylene-based copolymer has a molecular weight distribution of less than 3.5.

7. The film structure of claim 1, wherein the propylene-based copolymer has a molecular weight distribution of less than 3.0.

8. A multi-layer elastic air quenched blown film structure, the film comprising:
   A. A first layer comprising from 40 to 80 percent by weight of the film structure, the first layer comprising:
      (1) from 50 to 100% by weight of a propylene-based copolymer having substantially isotactic propylene sequences, the propylene-based copolymer comprising from 84 to 91 percent by weight units derived from propylene and from about 9 to about 16 percent by weight units derived from ethylene, the propylene-based copolymer having a melt flow rate (MFR) of from 0.1 to 10 g/10 min, a heat of fusion of from 2 to 50 Joules/gram, a molecular weight distribution (MwMn) of less than 4, and a density of from 0.855 to 0.876 g/ml; and (2) optionally, from 50 to 15 percent by weight of an linear low density polyethylene copolymer having a melt index (MI) from 0.1 to 10 g/10 minutes and a density of from 0.900 to 0.923 g/ml; and
   B. A second layer comprising from 10 to 30 percent by weight of the film structure, the second layer comprising: (1) from 70 to 100 percent of an in-reactor blend of a substantially linear polyethylene (or a homogeneously branched linear polyethylene) and a linear low density polyethylene having a density of from 0.900 to 0.925 g/ml and a melt index (MI) of from 0.5 to 1.5 g/10 minutes; and
      (2) from 0 to 30 percent of a low density polyethylene having a density of from 0.918 to 0.928 g/ml and having a melt index (MI) of from 0.25 to 1 g/10 minutes; and
   (3) optionally, from 1000 to 20,000 ppm anti-block additive, the film structure exhibiting: (a) a dart impact value of at least 220 g/mil according to ISO 7765-1, (b) an Elmendorf tear strength of at least 250 g/mil in the machine direction according to ASTM D-1922, (c) an Elmendorf tear strength of at least 300 g/mil in the cross direction according to ASTM D-1922, an (d) elastic recovery of at least 78 percent in cross direction after being extended to a strain of 200 percent its original length, and (e) a final holding force in the stretch hood test of at least 3631 bft/inch$^2$ (after a normal stretch (160%-140%) test).

9. The film structure of claim 8, the film structure having a core layer comprised of the first layer A and two outer layers, wherein at least one of the outer layers is comprised of the second layer B.

10. The film structure of claim 9, where the film structure has a core layer comprised of the first layer A, sandwiched between two second layers B.

11. The film structure of claim 8, wherein the film structure exhibits a final holding force in a stretch hood test of at least 700 lbft/inch$^2$ after a high stretch (200%-175%) test.

12. The film structure of claim 8, wherein the film structure exhibits a final holding force in a stretch hood test of at least 730 lbft/inch$^2$ after a high stretch (200%-175%) test.

13. The film structure of claim 8, wherein the propylene-based copolymer has a molecular weight distribution of less than 3.5.

14. The film structure of claim 8, wherein the propylene-based copolymer has a molecular weight distribution of less than 3.0.

15. The film structure of claim 8, wherein the first layer A further comprises an in-reactor blend as described in B(I).

16. The film structure of claim 15, wherein the in-reactor blend comprises 15 to 50 percent by weight of the first layer A.

17. A multi-layer elastic air quenched blown film structure, the film comprising:
  A. A first layer comprising from 40 to 80 percent by weight of the film structure, the first layer comprising:
    (1) from 40 to 85% by weight of a propylene-based copolymer having substantially isotactic propylene sequences, the propylene-based copolymer comprising from 84 to 91 percent by weight units derived from propylene and from about 9 to about 16 percent by weight units derived from ethylene, the propylene-based copolymer having a melt flow rate (MFR) of from 0.1 to 10 g/10 min, a heat of fusion of from 2 to 50 Joules/gram, a molecular weight distribution (Mw/Mn) of less than 4, and a density of from 0.855 to 0.876 g/ml; and
    (2) from 60 to 15 percent by weight of a low density polyethylene polymer having a melt index (MI) from 0.1 to 5 g/10 minutes and a density of from 0.918 to 0.928 g/ml; and
  B. A second layer comprising from 10 to 30 percent by weight of the film structure, the second layer comprising:
    (1) from 40 to 100 percent by weight of a linear low density polyethylene copolymer having a density of from 0.900 to 0.923 g/ml and having a melt index (MI) of from 0.1 to 10 g/10 minutes; and
    (2) from 0 to 60 percent by weight of a low density polyethylene having a density of from 0.918 to 0.928 g/ml and a melt index (MI) of from 0.1 to 9 g/10 minutes; and
    (3) from 0 to 20 percent by weight of a propylene-based copolymer having substantially isotactic propylene sequences, the propylene-based copolymer comprising from 84 to 91 percent by weight units derived from propylene and from about 9 to about 16 percent by weight units derived from ethylene, the propylene-based copolymer having a melt flow rate (MFR) of from 0.1 to 10 g/10 min, a heat of fusion of from 2 to 50 Joules/gram, a molecular weight distribution (Mw/Mn) of less than 4, and a density of from 0.855 to 0.876 g/ml; and
    (4) optionally, from 1000 to 20,000 ppm anti-block additive; and
    (5) optionally, from 200 to 1000 ppm slip additive, the film structure exhibiting: (a) a dart impact value of at least 160 g/mil according to ASTM D-1720 (type B), (b) an Elmendorf tear strength of at least 250 g/mil in the machine direction according to ASTM D-1922, (c) an Elmendorf tear strength of at least 370 g/mil in the cross direction according to ASTM D-1922, and (d) a final holding force in an alternate stretch hood test of at least 350 lbft/inch$^2$ (after a high stretch (200%-175%) test).

18. The film structure of claim 17, the film structure having a core layer comprised of the first layer A and two outer layers, wherein at least one of the outer layers is comprised of the second layer B.

19. The film structure of claim 18, wherein the film structure has a core layer comprised of the first layer A, sandwiched between two second layers B.

20. The film structure of claim 17, wherein the film structure exhibits a final holding force in an alternate stretch hood test of at least 375 lbft/inch$^2$ after a high stretch (200%-175%) test.

* * * * *